United States Patent
Tanaka et al.

(10) Patent No.: US 12,142,730 B2
(45) Date of Patent: Nov. 12, 2024

(54) THREAD BATTERY AND CONNECTOR-ATTACHED THREAD BATTERY

(71) Applicant: Murata Manufacturing Co., Ltd., Nagaokakyo (JP)

(72) Inventors: Kou Tanaka, Nagaokakyo (JP); Masahiko Kondo, Nagaokakyo (JP); Makoto Yoshioka, Nagaokakyo (JP); Yukio Ehara, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 903 days.

(21) Appl. No.: 17/212,581

(22) Filed: Mar. 25, 2021

(65) Prior Publication Data

US 2021/0210780 A1 Jul. 8, 2021

Related U.S. Application Data

(63) Continuation of application No. PCT/JP2019/037285, filed on Sep. 24, 2019.

(30) Foreign Application Priority Data

Sep. 27, 2018 (JP) ................... 2018-182471

(51) Int. Cl.
*H01M 6/18* (2006.01)
*H01M 4/131* (2010.01)
(Continued)

(52) U.S. Cl.
CPC ......... *H01M 10/058* (2013.01); *H01M 4/131* (2013.01); *H01M 4/485* (2013.01);
(Continued)

(58) Field of Classification Search
CPC ....... H01M 10/0422; H01M 2004/025; H01M 4/75; H01M 4/70; H01M 4/667; H01M 50/107; H01M 6/187
See application file for complete search history.

(56) References Cited

U.S. PATENT DOCUMENTS

| 4,522,897 A | * | 6/1985 | Walsh | ..................... H01M 4/08 429/127 |
| 4,810,599 A | | 3/1989 | Kondo et al. | |

(Continued)

FOREIGN PATENT DOCUMENTS

| JP | S46-005944 Y1 | 3/1971 |
| JP | S64-000657 A | 1/1989 |

(Continued)

OTHER PUBLICATIONS

Written Opinion of the International Searching Authority issued for PCT/JP2019/037285, date of mailing Dec. 24, 2019.
(Continued)

*Primary Examiner* — Imran Akram
(74) *Attorney, Agent, or Firm* — ArentFox Schiff LLP

(57) ABSTRACT

A thread battery that includes: a thread-like solid electrolyte that extends in a longitudinal direction between a first end and a second end that face each other in the longitudinal direction; a first electrode on a first part of an outer peripheral surface of the solid electrolyte along the longitudinal direction; a second electrode on a second part of the outer peripheral surface of the solid electrolyte along the longitudinal direction, wherein the first electrode and the second electrode do not contact each other; a first current collector on an outer peripheral surface of the first electrode along the longitudinal direction; and a second current collector on an outer peripheral surface of the second electrode along the longitudinal direction.

18 Claims, 9 Drawing Sheets

(51) Int. Cl.
*H01M 4/485* (2010.01)
*H01M 10/0562* (2010.01)
*H01M 10/058* (2010.01)
*H01M 50/107* (2021.01)
*H01M 50/548* (2021.01)

(52) U.S. Cl.
CPC ....... *H01M 6/187* (2013.01); *H01M 10/0562* (2013.01); *H01M 50/107* (2021.01); *H01M 50/548* (2021.01); *H01M 2300/0071* (2013.01)

(56) References Cited

U.S. PATENT DOCUMENTS

| | | | |
|---|---|---|---|
| 2007/0243456 A1 | 10/2007 | Ahn et al. | |
| 2008/0137890 A1* | 6/2008 | Petersen | H01M 10/0431 429/231.95 |
| 2009/0087723 A1 | 4/2009 | Inda | |
| 2011/0274954 A1* | 11/2011 | Cho | H01M 50/559 429/94 |
| 2012/0009331 A1* | 1/2012 | Kwon | H01M 4/765 427/58 |
| 2012/0015233 A1* | 1/2012 | Kwon | H01M 6/44 429/149 |
| 2012/0100412 A1* | 4/2012 | Kwon | H01M 10/058 429/164 |
| 2012/0107658 A1* | 5/2012 | Kwon | H01M 4/75 429/94 |
| 2012/0148902 A1* | 6/2012 | Kwon | H01M 4/75 429/165 |
| 2012/0148918 A1* | 6/2012 | Kwon | H01M 10/0568 205/198 |
| 2012/0295144 A1* | 11/2012 | Kwon | H01M 10/0436 429/94 |
| 2013/0344368 A1* | 12/2013 | Kwon | H01M 4/78 429/120 |
| 2014/0011065 A1* | 1/2014 | Kwon | H01M 4/667 429/94 |
| 2014/0170453 A1* | 6/2014 | Kwon | H01M 4/663 429/94 |
| 2014/0170454 A1* | 6/2014 | Kwon | H01M 10/058 429/211 |
| 2014/0178726 A1* | 6/2014 | Kwon | H01M 10/0431 429/94 |
| 2014/0186672 A1* | 7/2014 | Kwon | H01M 50/417 429/94 |
| 2014/0186673 A1* | 7/2014 | Kwon | H01M 10/0436 29/623.2 |
| 2014/0212720 A1* | 7/2014 | Kwon | H01M 4/42 429/94 |
| 2014/0234681 A1* | 8/2014 | Kwon | H01M 4/623 429/94 |
| 2014/0377617 A1* | 12/2014 | Kwon | H01M 4/625 429/94 |
| 2014/0377618 A1* | 12/2014 | Kwon | H01M 4/625 429/94 |
| 2015/0004453 A1* | 1/2015 | Kwon | H01M 10/0422 429/94 |
| 2018/0183067 A1* | 6/2018 | Zhamu | H01M 4/382 |

FOREIGN PATENT DOCUMENTS

| | | | |
|---|---|---|---|
| JP | 2001-093581 A | 4/2001 | |
| JP | 2009-087814 A | 4/2009 | |
| JP | 2009-193888 A | 8/2009 | |
| JP | 4971139 B2 | 4/2012 | |
| JP | 2014-026747 A | 2/2014 | |
| JP | 2017-168388 A | 9/2017 | |
| JP | 2017-183115 A | 10/2017 | |
| KR | 101366011 B1 * | 2/2014 | H01M 4/75 |

OTHER PUBLICATIONS

International Search Report issued for PCT/JP2019/037285, date of mailing Dec. 24, 2019.

\* cited by examiner

SECTIONAL VIEW ALONG LINE A-A

SECTIONAL VIEW ALONG LINE B-B

SECTIONAL VIEW ALONG LINE C-C

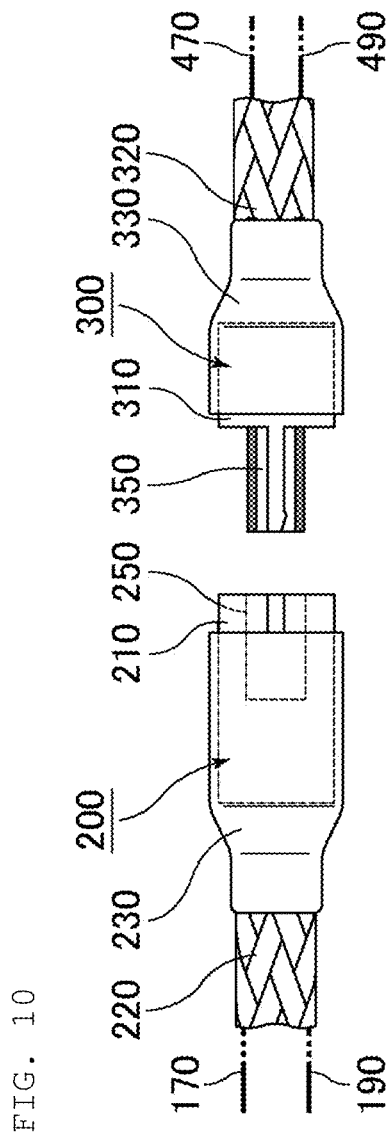

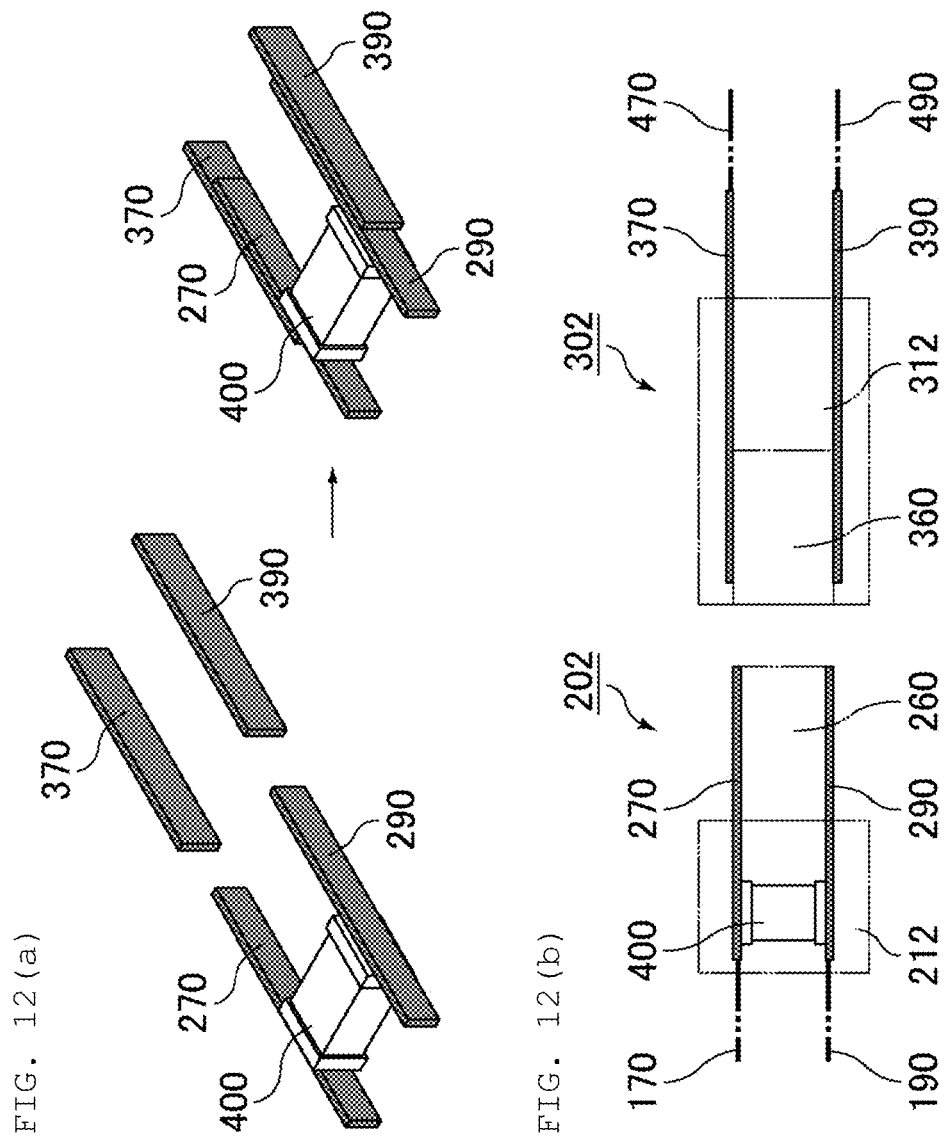

THREAD BATTERY AND CONNECTOR-ATTACHED THREAD BATTERY

CROSS REFERENCE TO RELATED APPLICATIONS

The present application is a continuation of International application No. PCT/JP2019/037285, filed Sep. 24, 2019, which claims priority to Japanese Patent Application No. 2018-182471, filed Sep. 27, 2018, the entire contents of each of which are incorporated herein by reference.

FIELD OF THE INVENTION

The present invention relates to a thread battery and a connector-attached thread battery.

BACKGROUND OF THE INVENTION

In recent years, as electronic devices have become smaller and thinner, the shape of a battery for power supply has been demanded to follow this smaller and thinner storage space.

Examples of a shape that easily follows the shape of the storage space include that of a thread-type battery as described in Patent Document 1. Patent Document 1 discloses a thread-type battery transformable into a variety of shapes. This thread-type battery includes: an internal electrode composed of an internal current collector and a negative electrode material coated on a peripheral surface of the internal current collector; an electrolyte installed outside the internal electrode; a positive electrode material coated on a peripheral surface of the electrolyte; and an external current collector and a protective coating portion which are provided on a peripheral surface of the positive electrode material.

Patent Document 1: Japanese Patent No. 4971139

SUMMARY OF THE INVENTION

However, Patent Document 1 does not disclose any specific method for drawing a current from the thread-type battery to the outside. Moreover, the thread-type battery disclosed in Patent Document 1 has had a problem that, since the internal current collector is present inside the battery, a position from which the current can be drawn out is fixed, and a degree of freedom in an extended position of an external electrode is low. In addition, Patent Document 1 discloses that the battery can be deformed into various shapes; however, the battery has had a problem that, when a sulfide-based solid electrolyte is used as the electrolyte, flexibility is insufficient, and when being deformed, the solid electrolyte is broken, and a battery function is stopped.

The present invention has been made to solve the above problem, and an object of the present invention is to provide a thread battery in which a degree of freedom in an extended position of an external electrode is high, and a battery function is less likely to be stopped at the time of breakdown. Another object of the present invention is to provide a connector-attached thread battery in which a connector is connected to an end of the thread battery.

A thread battery of the present invention includes: a thread-like solid electrolyte that extends in a longitudinal direction between a first end and a second end that face each other in the longitudinal direction; a first electrode on a first part of an outer peripheral surface of the solid electrolyte along the longitudinal direction; a second electrode on a second part of the outer peripheral surface of the solid electrolyte along the longitudinal direction, wherein the first electrode and the second electrode do not contact each other; a first current collector on an outer peripheral surface of the first electrode along the longitudinal direction; and a second current collector on an outer peripheral surface of the second electrode along the longitudinal direction.

A connector-attached thread battery of the present invention includes: the thread battery of the present invention; and a connector connected to the first end or second end of the thread battery, wherein the connector includes: a first connection terminal connected to the first current collector; and a second connection terminal connected to the second current collector.

According to the present invention, the thread battery can be provided, in which the degree of freedom in the extended position of the external electrode is high, and the battery function is less likely to be stopped at the time of breakdown.

BRIEF EXPLANATION OF THE DRAWINGS

FIG. 10 is a schematic view illustrating still another example of the connector-attached thread battery and the external connector according to the present invention.

FIG. 12(a) is a perspective view schematically illustrating another example of the connection terminals which constitute the connector and the external terminals which constitute the external connector, and FIG. 12(b) is a view schematically illustrating a state of a connector including the connection terminals illustrated in FIG. 12(a) and an external connector including the external terminals illustrated in FIG. 12(a).

DETAILED DESCRIPTION OF THE INVENTION

Figure 1:
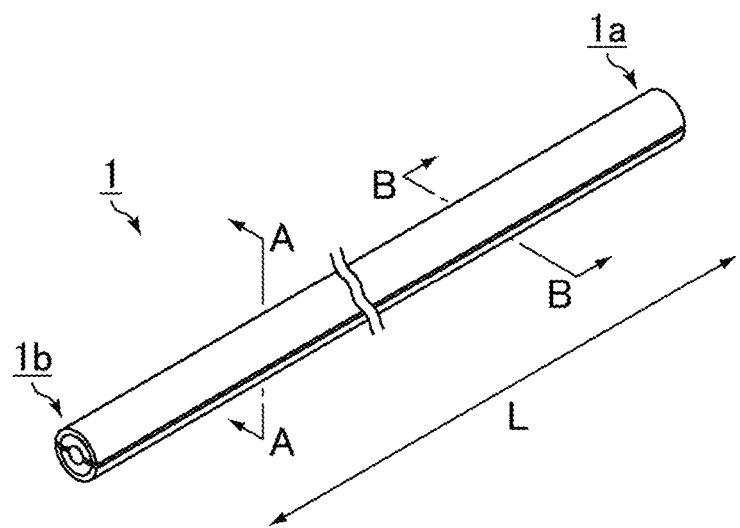
FIG. 1 is a perspective view schematically illustrating an example of a thread battery of the present invention.

A description will be given below of a thread battery and a connector-attached thread battery according to the present invention.

However, the present invention is not limited to the following embodiments, and can be appropriately modified and applied with the modification within the scope without changing the spirit of the present invention. It should be noted that those obtained by combining two or more of individual desirable configurations to be described below are also the present invention.

The thread battery of the present invention has a first end and a second end opposite to the first end in a longitudinal direction.

The thread battery of the present invention includes: a thread-like solid electrolyte that extends in a longitudinal direction between a first end and a second end that face each other in the longitudinal direction; a first electrode on a first part of an outer peripheral surface of the solid electrolyte along the longitudinal direction; a second electrode on a second part of the outer peripheral surface of the solid electrolyte along the longitudinal direction, wherein the first electrode and the second electrode do not contact each other; a first current collector on an outer peripheral surface of the first electrode along the longitudinal direction; and a second current collector on an outer peripheral surface of the second electrode along the longitudinal direction.

In the thread battery of the present invention, the first current collector and the second current collector extend along the longitudinal direction on the outer peripheral surfaces of the first electrode and the second electrode, respectively. Since regions from which the first electrode and the second electrode can be extended are exposed and extend along the longitudinal direction, a current can be drawn from any spot, and a degree of freedom in an extended position of an external electrode is high.

Moreover, if the first current collector and the second current collector extend along the longitudinal direction on the outer peripheral surfaces of the first electrode and the second electrode, respectively, when the first current collector and the second current collector are not broken even when the first electrode, the second electrode and the solid electrolyte are broken, a portion other than such broken regions functions as a battery, and accordingly, a battery function is less likely to be stopped at the time of such breakdown. In particular, when the current collectors are composed of a highly ductile material, the current collectors are flexible and difficult to fracture, and accordingly, a short circuit can be prevented as described above.

Moreover, when glass or ceramic is used as a main material of the electrodes or the solid electrolyte, even if each of the electrodes and the solid electrolyte is fractured by being applied with a stress, continuous breakdown starting from each fractured fragment is unlikely to occur, and accordingly, each of the electrodes and the solid electrolyte is less likely to shatter, a short circuit thereof is prevented, and the battery function is maintained.

A configuration of the thread battery of the present invention will be described with reference to FIGS. 1 to 3.

Figure 2:
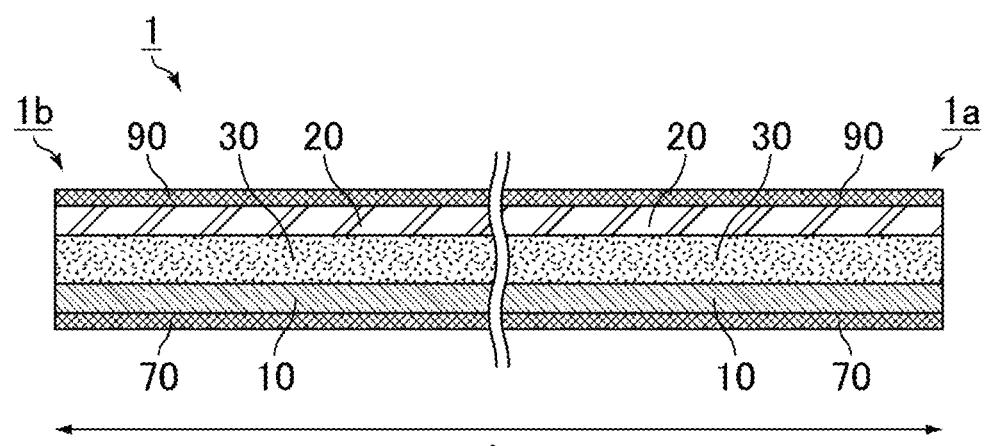
FIG. 2 is a sectional view taken along a line A-A in FIG. 1.
Figure 3:
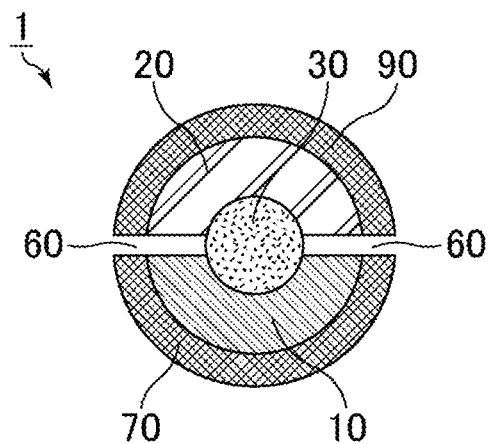
FIG. 3 is a sectional view taken along a line B-B in FIG. 1.

FIG. 1 is a perspective view schematically illustrating an example of the thread battery of the present invention, FIG. 2 is a sectional view taken along a line A-A in FIG. 1, and FIG. 3 is a sectional view taken along a line B-B in FIG. 1.

As illustrated in FIG. 1, a thread battery 1 has a thread-like shape that extends along the longitudinal direction (direction indicated by a double arrow L in FIG. 1), and has a first end 1a and a second end 1b which face each other.

As illustrated in FIGS. 2 and 3, the thread battery 1 includes a thread-like solid electrolyte 30 that extends in the longitudinal direction (direction indicated by a double arrow L in FIG. 2); a first electrode 10 on a first part of an outer peripheral surface of the solid electrolyte 30 along the longitudinal direction; a second electrode 20 on a second part of an outer peripheral surface of the solid electrolyte 30 along the longitudinal direction; a first current collector 70 on an outer peripheral surface of the first electrode 10 along the longitudinal direction; and a second current collector 90 on an outer peripheral surface of the second electrode 20 along the longitudinal direction.

In the thread battery 1, the first electrode 10 and the second electrode 20 are disposed so as to face each other with the solid electrolyte 30 interposed therebetween and not to come in contact with each other.

As illustrated in FIG. 3, in the thread battery 1, each of the first electrode 10 and the second electrode 20 are disposed on separate parts of the outer peripheral surface of the solid electrolyte 30, and both are disposed so as not to come in contact with each other with gaps 60 interposed therebetween.

In the thread battery 1 illustrated in FIG. 3, two gaps 60 having the same size are provided; however, sizes of the two gaps 60 may be the same or different from each other.

Moreover, a distance between the first electrode 10 and the second electrode 20 which are separated from each other by the gaps 60 does not have to be constant.

Figure 4A:
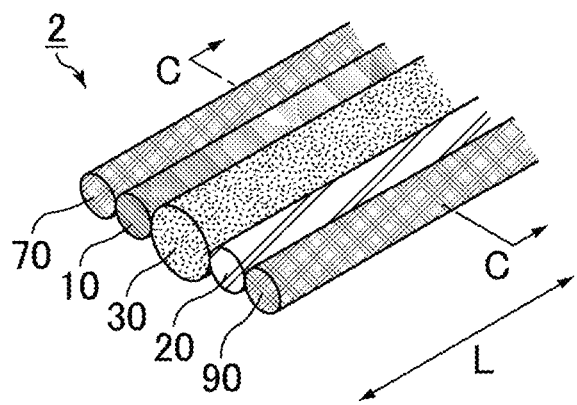
FIG. 4(a) is a perspective view schematically illustrating another example of the thread battery of the present invention.
Figure 4B:
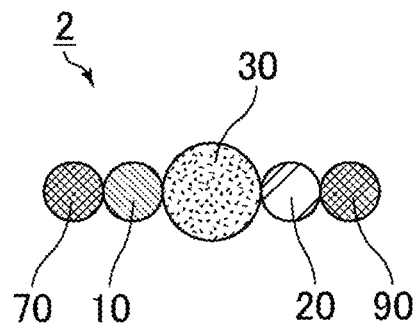
FIG. 4(b) is a sectional view taken along a line C-C in FIG. 4(a).

FIG. 4(a) is a perspective view schematically illustrating another example of the thread battery of the present invention, and FIG. 4(b) is a sectional view taken along a line C-C in FIG. 4(a).

As illustrated in FIGS. 4(a) and 4(b), a thread battery 2 is composed of a solid electrolyte 30, a first electrode 10, a second electrode 20, a first current collector 70, and a second current collector 90.

The solid electrolyte 30, the first electrode 10, the second electrode 20, the first current collector 70 and the second current collector 90 all have a thread shape that extends along the longitudinal direction (direction indicated by a double arrow L in FIG. 4(a), which is a paper depth direction in FIG. 4(b)), and the first electrode 10 and the second electrode 20 are disposed along the longitudinal direction on a part of the outer peripheral surface of the solid electrolyte 30 so as to face each other and not to come into contact with each other.

Moreover, the first current collector 70 is disposed on the outer peripheral surface of the first electrode 10 along the longitudinal direction, and the second current collector 90 is disposed on the outer peripheral surface of the second electrode 20 along the longitudinal direction.

In the thread battery of the present invention, each of the first electrode and the second electrode is only required to be disposed on a part of the outer peripheral surface of the solid electrolyte, and the first electrode 10 and the second electrode 20 do not necessarily have to face each other.

Moreover, in the thread battery of the present invention, with regard to the first electrode, the number thereof is not limited to one as long as all thereof are disposed on a part of the outer peripheral surface of such a solid electrolyte layer so as not to come into contact with the second electrode, and two or more of the first electrodes may be disposed. In this case, preferably, the number of the first current collectors is set to two or more according to needs.

With regard to the second electrode, like the first electrode, the number thereof is not limited to one as long as such second electrodes are disposed on a part of the outer peripheral surface of the solid electrolyte layer so as not to come into contact with the first electrode, and two or more of the second electrodes may be disposed. In this case, preferably, the number of the second current collectors is set to two or more according to needs.

In the thread battery of the present invention, preferably, at least a part of an outermost peripheral surface thereof is covered with an insulating film made of an insulating material.

Here, the outermost peripheral surface means an outermost peripheral surface of a structure composed of the first electrode, the second electrode, the solid electrolyte, the first current collector, and the second current collector.

When the outermost peripheral surface is covered with an insulating film made of an insulating material, the first electrode, the second electrode and the solid electrolyte can be prevented from being damaged or unintentionally short-circuited by an external impact, vibration or the like.

Figure 5:
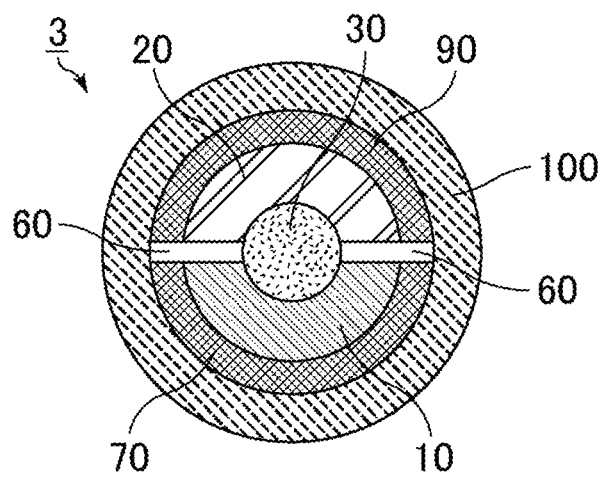
FIG. 5 is a sectional view schematically illustrating an example of a thread battery provided with an insulating film.

FIG. 5 is a sectional view schematically illustrating an example of a thread battery provided with an insulating film.

A thread battery 3 illustrated in FIG. 5 corresponds to the one in which an insulating film 100 made of an insulating material is provided on the outermost peripheral surface of the thread battery 1 illustrated in FIG. 3.

In the thread battery 3, the gaps 60 illustrated in FIG. 3 remain. Therefore, a stress is applied to the thread battery 3 to deform the first electrode 10, the second electrode 20, and the solid electrolyte 30, whereby the first electrode 10 and the second electrode 20 can be brought into contact with each other to be intentionally short-circuited. When the stress is released, the deformation of the first electrode 10, the second electrode 20, and the solid electrolyte 30 is resolved, and the short circuit is eliminated. By such an intentional short circuit, the capacity of the battery can be intentionally adjusted.

Note that the insulating film may be formed so that the gaps 60 of the thread battery 1 illustrated in FIG. 3 are filled with the insulating material.

Figure 6:
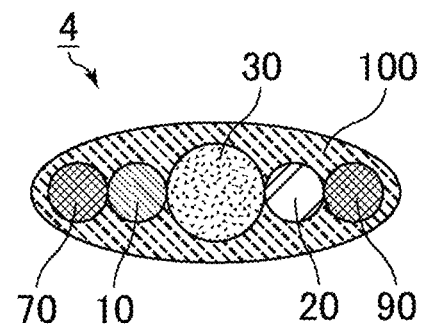
FIG. 6 is a sectional view schematically illustrating another example of the thread battery provided with the insulating film.

FIG. 6 is a sectional view schematically illustrating another example of the thread battery provided with the insulating film.

A thread battery 4 illustrated in FIG. 6 corresponds to the one in which an insulating film 100 made of an insulating material is provided on the outermost peripheral surface of the thread battery 2 illustrated in FIG. 4(b).

The thread battery of the present invention preferably has flexibility.

If the thread battery has flexibility, the thread battery can easily follow a shape of the storage space.

Note that, in the present description, the thread battery is determined to have flexibility when not being broken even if being deformed until a radius of curvature thereof becomes 50 mm.

If the thread battery is not broken when the thread battery is disposed along an inner peripheral surface of a ring having an inner diameter of 100 mm, the thread battery is determined not to be broken even if being deformed until the radius of curvature becomes 50 mm, that is, to have flexibility.

A diameter of the thread battery of the present invention is not particularly limited; however, is preferably 0.005 mm to 1 mm.

When the diameter of the thread battery is 0.005 mm to 1 mm, the thread battery has sufficient flexibility, and becomes easy to follow the shape of the storage space.

When the diameter of the thread battery is less than 0.005 mm, the diameter of the thread battery is too small to obtain a sufficient capacity. On the other hand, when the diameter of the thread battery exceeds 1 mm, the flexibility of the thread battery decreases.

Note that the diameter of the thread battery can be obtained by measuring diameters of sections perpendicular to the longitudinal direction of the thread battery at 10 randomly selected spots and by taking an average value therefrom. However, when a sectional shape of the thread battery is not circular, a diameter of each circle corresponding to a projected area obtained from an area of the section is defined as the diameter of the section.

When the above insulating film is formed, a thickness of the insulating film is also included in the diameter of the thread battery. Moreover, when gaps are provided between the first electrode and the second electrode, an area of the gaps is not included in the area of the section.

A length of the thread battery of the present invention in the longitudinal direction is not particularly limited; however, is preferably 1 mm or more.

In the thread battery of the present invention, a ratio of the diameter to the length is not particularly limited; however, [(length)/(diameter)] is preferably 5 or more.

In the thread battery of the present invention, the sectional shape of the section perpendicular to the longitudinal direction is not particularly limited, and may be a circle, an elliptical shape, a polygonal shape, or the like, and a shape formed by combining a plurality of these shapes.

In the thread battery of the present invention, one of the first electrode and the second electrode serves as a positive electrode, and the other serves as a negative electrode. A description will be given below of an example in which the first electrode is a positive electrode and the second electrode is a negative electrode.

[First Electrode]

The first electrode is composed of a sintered body containing positive electrode active material particles.

Examples of a material that constitutes the positive electrode active material particles include oxides such as a lithium-containing phosphoric acid compound having a NASICON-type structure, a lithium-containing phosphoric acid compound having an olivine-type structure, a lithium-containing layered oxide, and a lithium-containing oxide having a spinel-type structure.

Specific examples of a lithium-containing phosphoric acid compound that has a NASICON-type structure and is to be preferably used include $Li_3V_2(PO_4)_3$, and the like. Specific examples of a lithium-containing phosphoric acid compound that has an olivine-type structure and is to be preferably used include $LiFePO_4$, $LiCoPO_4$, $LiMnPO_4$, and the like. Specific examples of a preferably used lithium-containing layered oxide include $LiCoO_2$, $LiCo_{1/3}Ni_{1/3}Mn_{1/3}O_2$, and the like. Specific examples of a lithium-containing oxide that has a spinel-type structure and is to be preferably used include $LiMn_2O_4$, $LiNi_{0.5}Mn_{1.5}O_4$, and the like.

Only one of these positive electrode active material particles may be used, or a plurality of types thereof may be mixed and used.

Among them, $Li_3V_2(PO_4)_3$ is particularly preferable.

The first electrode may contain solid electrolyte particles and conductive particles in addition to the positive electrode active material particles.

Examples of a material that constitutes the solid electrolyte particles include oxides which constitute the solid electrolyte to be described later.

The solid electrolyte particles are preferably the same as the oxides which constitute the solid electrolyte to be described later.

When the first electrode contains the solid electrolyte particles, and the solid electrolyte particles are the same as the oxides which constitute the solid electrolyte, then bonding between the first electrode and the solid electrolyte becomes strong, and a response rate and mechanical strength thereof are improved.

Examples of the conductive particles include particles composed of a metal such as Ag, Au, Pt and Pd, carbon, a compound having electron conductivity, a mixture obtained by combining these, and the like. Moreover, these substances having conductivity may be contained in the first electrode in a state of being coated on the surfaces of the positive electrode active material particles.

[Second Electrode]

The second electrode is composed of a sintered body containing negative electrode active material particles.

Examples of a material that constitutes the negative electrode active material particles include a compound represented by $MO_X$ (M is at least one selected from the group consisting of Ti, Si, Sn, Cr, Fe, Nb, V and Mo. $0.9 \leq X \leq 3.0$), a compound represented by $Li_YMO_X$ (M is at least one selected from the group consisting of Ti, Si, Sn, Cr, Fe, Nb, V and Mo. $0.9 \leq X \leq 3.0$, $2.0 \leq Y \leq 4.0$), a graphite-lithium compound, a lithium alloy, a lithium-containing phosphoric acid compound having a NASICON-type structure, a lithium-containing phosphoric acid compound having an olivine-type structure, a lithium-containing oxide having a spinel-type structure, and the like, and the material is preferably an oxide such as the compound represented by $MO_X$, the compound represented by $Li_YMO_X$, the lithium-containing phosphoric acid compound having a NASICON-type structure, the lithium-containing phosphoric acid compound having an olivine-type structure, and the lithium-containing oxide having a spinel-type structure.

The compound represented by $MO_X$ may have a part of oxygen substituted with P or Si, or may contain Li. Specific examples of the lithium alloy to be preferably used include Li—Al and the like. Specific examples of the lithium-containing phosphoric acid compound that has a NASICON-type structure and is to be preferably used include $Li_3V_2(PO_4)_3$, $Li_3Fe_2(PO_4)_3$, and the like. Specific examples of the lithium-containing oxide that has a spinel-type structure and is to be preferably used include $Li_4Ti_5O_{12}$ and the like. Only one of these negative electrode active material particles may be used, or a plurality of types thereof may be mixed and used.

Among them, $Li_3V_2(PO_4)_3$ is particularly preferable.

The second electrode may contain solid electrolyte particles and conductive particles in addition to the negative electrode active material particles.

Examples of a material that constitutes the solid electrolyte particles include oxides which constitute the solid electrolyte to be described later.

The solid electrolyte particles are preferably the same as the oxides which constitute the solid electrolyte to be described later.

When the second electrode contains the solid electrolyte particles, and the solid electrolyte particles are the same as the oxides which constitute the solid electrolyte, then bonding between the second electrode and the solid electrolyte becomes strong, and a response rate and mechanical strength thereof are improved.

Examples of those to be preferably used as the conductive particles include particles composed of a metal such as Ag, Au, Pt and Pd, carbon, a compound having electron conductivity, a mixture obtained by combining these, or the like. Moreover, these substances having conductivity may be contained in the second electrode in a state of being coated on the surfaces of the negative electrode active material particles or the like.

Note that, in the present description, the oxide does not include sulfide oxide.

[Solid Electrolyte]

Examples of the solid electrolyte include oxides such as a lithium-containing phosphoric acid compound having a NASICON-type structure.

Examples of a lithium-containing phosphoric acid compound that has a NASICON-type structure and is to be preferably used include $Li_xM_y(PO_4)_3$ ($0.9 \leq x \leq 1.9$, $1.9 \leq y \leq 2.1$, and M is at least one selected from the group consisting of Ti, Ge, Al, Ga and Zr).

As the lithium-containing phosphoric acid compound, $Li_{1.2}Al_{0.2}Ti_{1.8}(PO_4)_3$ is preferable.

Lithium-containing phosphoric acid compounds having two or more types of NASICON-type structures having different compositions may be mixed and used.

Examples of a preferred composition of the solid electrolyte include: a vitrifiable composition represented by $Li_{1+x}Al_xGe_{2-x}(PO_4)_3$ [for example, $Li_{1.5}Al_{0.5}Ge_{1.5}(PO_4)_3$, $Li_{1.2}Al_{0.2}Ge_{1.8}(PO_4)_3$, and the like], a vitrifiable composition represented by $Li_{1+x}Al_xGe_{2-x-y}Ti_y(PO_4)_3$ [for example, $Li_{1.5}Al_{0.5}Ge_{1.0}Ti_{0.5}(PO_4)_3$, $Li_{1.2}Al_{0.2}Ge_{1.3}Ti_{0.5}(PO_4)_3$, and the like], a mixture of at least one selected from the group consisting of $AlPO_4$, $SiO_2$ and $B_2O_3$ and $Li_{1+x}Al_xGe_{2-x}(PO_4)_3$ or $Li_{1+x}Al_xGe_{2-x-y}Ti_y(PO_4)_3$, a mixture of $Li_{1+x}Al_xGe_{2-x}(PO_4)_3$ and $Li_{1+x}Al_xGe_{2-x-y}Ti_y(PO_4)_3$, the one in which a part of Li of $Li_{1+x}Al_xGe_{2-x}(PO_4)_3$ or $Li_{1+x}Al_xGe_{2-x-y}Ti_y(PO_4)_3$ is replaced by Na, Co, Mn or Ni [for example, $Li_{1.1}Na_{0.1}Al_{0.2}Ge_{1.3}Ti_{0.5}(PO_4)_3$, $Li_{1.4}Na_{0.1}Al_{0.5}Ge_{1.0}Ti_{0.5}(PO_4)_3$, and the like, in each of which a part of Li is replaced by Na], and the one in which a part of Ge of $Li_{1+x}Al_xGe_{2-x}(PO_4)_3$ or $Li_{1+x}Al_xGe_{2-x-y}Ti_y(PO_4)_3$ is replaced by Zr, Fe or V [for example, $Li_{1.2}Al_{0.2}Ge_{1.7}Zr_{0.1}(PO_4)_3$, $Li_{1.5}Al_{0.5}Ge_{1.0}Ti_{0.4}Zr_{0.1}(PO_4)_3$, and the like, in each of which a part of Ge is replaced by Zr]. Two or more of these may be mixed and used.

In addition to the lithium-containing phosphoric acid compound having a NASICON-type structure, the solid electrolyte may further contain an oxide solid electrolyte having a perovskite-type structure or an oxide solid electrolyte having a garnet-type or garnet-like structure. Specific examples of the oxide solid electrolyte having a perovskite-type structure include $La_{0.55}Li_{0.35}TiO_3$, and specific examples of the oxide solid electrolyte having a garnet-type or garnet-like structure include, for example, $Li_7La_3Zr_2O_{12}$.

In the thread battery of the present invention, preferably, the first electrode, the second electrode, and the solid electrolyte all contain oxides.

When the first electrode, the second electrode, and the solid electrolyte all contain oxides, it becomes easy to form a sintered body. Moreover, even if the sintered body containing an oxide is fractured by being applied with a stress, continuous breakdown starting from each fractured fragment is unlikely to occur, and accordingly, the sintered body is less likely to shatter, a short circuit thereof is prevented, and a function of the battery is maintained.

In the thread battery of the present invention, preferably, at least one of the first electrode and the second electrode contains the same oxide as that of the solid electrolyte, and more preferably, both the first electrode and the second electrode contain the same oxide as that of the solid electrolyte. In particular, preferably, at least one of the first electrode and the second electrode contains such a lithium-containing phosphoric acid compound as $Li_{1.2}Al_{0.2}Ti_{1.8}(PO_4)_3$, and more preferably, both the first electrode and the second electrode contain the above lithium-containing phosphoric acid compound.

An electrode containing the same oxide as that of the solid electrolyte has a strong bond with the solid electrolyte, and accordingly, a response rate and mechanical strength thereof are improved.

In the thread battery of the present invention, preferably, the first electrode, the second electrode and the solid electrolyte do not substantially contain a sulfide or a sulfide oxide.

When the first electrode contains the same oxide as that of the solid electrolyte, a content thereof is preferably 30% by weight to 70% by weight.

If the content of the oxide in the first electrode is less than 30% by weight, then bonding strength between the first electrode and the solid electrolyte may not be sufficiently improved. On the other hand, if the content exceeds 70% by weight, then a ratio of the positive electrode active material particles in the first electrode decreases, and accordingly, an energy density may decrease.

Note that the content of the oxide in the first electrode can be measured by composition analysis such as inductively coupled plasma (ICP) emission spectroscopy. Moreover, for simplicity, data analysis such as powder X-ray diffraction (XRD) can also be used.

When the second electrode contains the same oxide as that of the solid electrolyte, a content thereof is preferably 30% by weight to 70% by weight.

If the content of the oxide in the second electrode is less than 30% by weight, then bonding strength between the second electrode and the solid electrolyte may not be sufficiently improved. On the other hand, if the content exceeds 70% by weight, then a ratio of the negative electrode active material particles in the second electrode decreases, and accordingly, the energy density may decrease.

Note that the oxide content in the second electrode can be measured in a similar manner to that in the first electrode.

[Current Collector]

The first current collector and the second current collector will be described.

When the first electrode is a positive electrode, the first current collector is a positive electrode current collector, and when the second electrode is a negative electrode, the second current collector is a negative electrode current collector.

The positive electrode current collector and the negative electrode current collector are not particularly limited as long as having electron conductivity. The positive electrode current collector and the negative electrode current collector can be composed of, for example, carbon, an oxide and a composite oxide which have high electron conductivity, a metal, or the like. For example, the positive electrode current collector and the negative electrode current collector can be composed of Pt, Au, Ag, Al, Cu, stainless steel, indium tin oxide (ITO), or the like.

Ni or Al is preferable as such a material that constitutes the positive electrode current collector. On the other hand, Cu is preferable as such a material that constitutes the negative electrode current collector.

[Insulating Film]

A material that constitutes the insulating film is only required to be an insulating material, and examples thereof include glass, ceramic, an insulating resin, and the like.

Examples of the glass include quartz glass ($SiO_2$), composite oxide-based glass obtained by combining at least two selected from the group consisting of $SiO_2$, PbO, $B_2O_3$, MgO, ZnO, $Bi_2O_3$, $Na_2O$ and $Al_2O_3$, and the like.

Examples of the ceramics include alumina, cordierite, mullite, steatite, forsterite, and the like.

Examples of the insulating resin include: thermoplastic resin such as polyethylene, polypropylene, polyvinyl chloride, polystyrene, polyvinyl acetate, thermoplastic polyurethane, and Teflon (registered trademark); thermosetting resin such as phenol resin, epoxy resin, melamine resin, urea resin, unsaturated polyester resin, alkyd resin, polyurethane, and thermosetting polyimide; photocurable resin; and the like.

A thickness of the insulating film is not particularly limited; however, is preferably 0.005 mm to 1 mm.

[Connector-Attached Thread Battery]

A connector-attached thread battery of the present invention includes: the thread battery described herein; and a connector connected to the first end or second end of the thread battery, wherein the connector includes: a first connection terminal connected to the first current collector; and a second connection terminal connected to the second current collector.

In the connector-attached thread battery of the present invention, the thread battery can be easily connected to another electronic component with a connector interposed therebetween.

Moreover, a connector diameter is not particularly limited; however, can be suppressed to be larger than a diameter of the thread battery by up to approximately 5%. When the connector diameter is suppressed to be larger than such a thread battery diameter by up to approximately 5%, a sewing process is not hindered when the thread battery is sewn onto fiber.

Moreover, a stopper chuck is provided on the connector, whereby attachment/detachment thereof can also be facilitated.

[Connector]

The connector may be connected to only the first end of the thread battery, may be connected to only the second end thereof, or may be connected to both the first end and the second end. However, the connector connected to the first end and the connector connected to the second end are different from each other.

The connector may be connected to an external connector. The external connector is a connector connected to an electronic device or the like, and is different from the connector included in the connector-attached thread battery of the present invention.

The connector included in the thread battery of the present invention is connected to the external connector, whereby the thread battery of the present invention can be connected to the electronic device.

The connector may have a recess or a protrusion, which is fittable to the external connector.

When the connector has a recess or a protrusion, which is fittable to the external connector, the recess of the connector and a protrusion of the external connector are fitted to each other, or the protrusion of the connector and a recess of the external connector are fitted to each other, whereby the connector can be easily connected to the electronic device or the like.

The thread battery and the connector-attached thread battery according to the present invention may be directly connected to the electronic device without interposing the external connector therebetween.

An example of the connector-attached thread battery of the present invention will be described with reference to FIG. 7.

Figure 7:
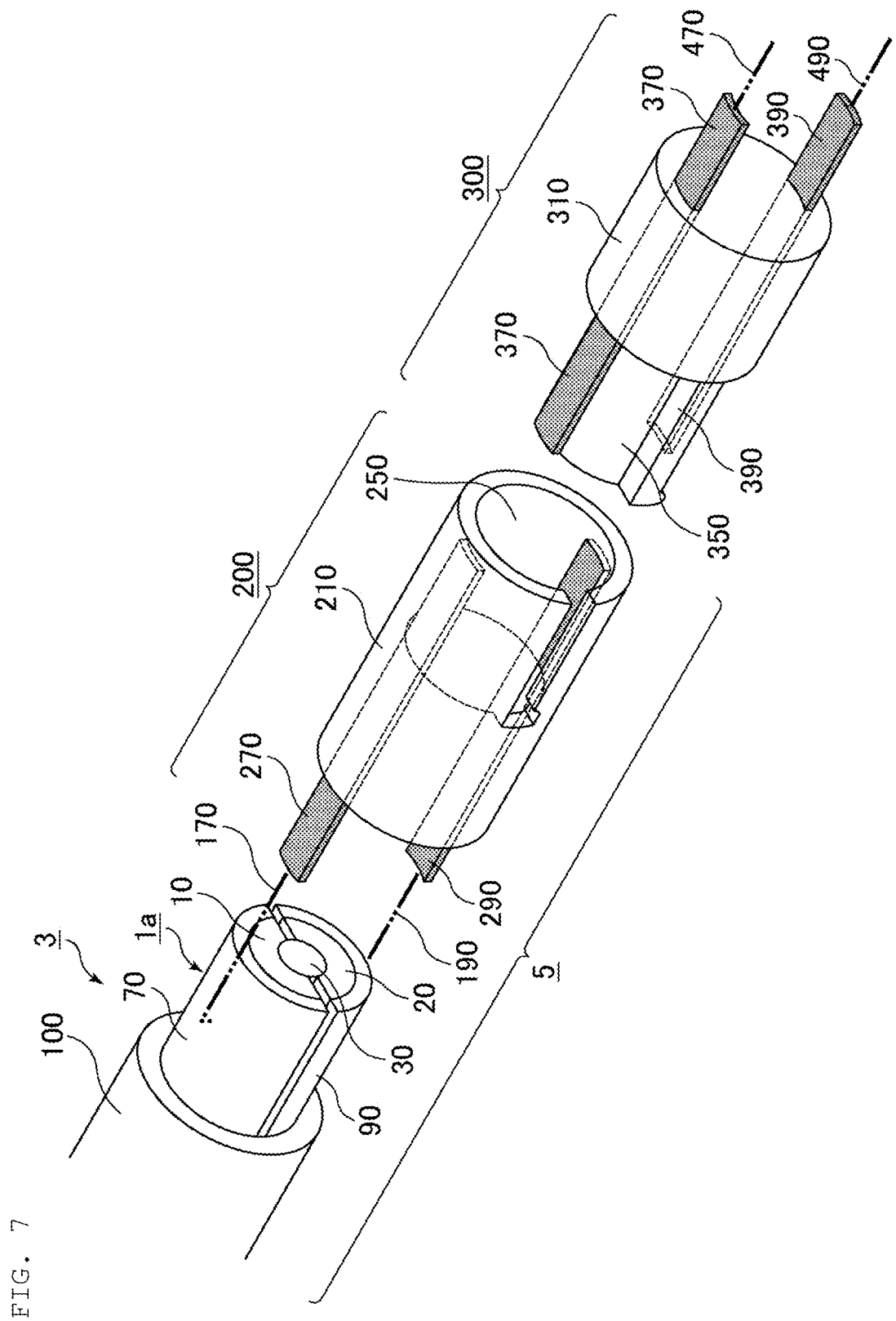
FIG. 7 is a perspective view schematically illustrating an example of a connector-attached thread battery of the present invention.

FIG. 7 is a perspective view schematically illustrating an example of the connector-attached thread battery of the present invention.

As illustrated in FIG. 7, a connector-attached thread battery 5 includes the thread battery 3 and a connector 200 connected to the first end 1a of the thread battery 3. The connector 200 is composed of a fitting housing 210, a first connection terminal 270, and a second connection terminal 290, the first connection terminal 270 is connected to the first current collector 70 of the thread battery 3 with a first conductor 170 (indicated by a two-dot dashed line in FIG. 7) interposed therebetween, and the second connection terminal 290 is connected to the second current collector 90 of the thread battery 3 with a second conductor 190 (indicated by a two-dot dashed line in FIG. 7) interposed therebetween.

The fitting housing 210 has a recess 250. A shape of the recess 250 corresponds to a shape of a protrusion 350 included in an external connector 300 to be connected to the connector 200. The recess 250 of the connector 200 and the protrusion 350 of the external connector 300 are fitted to each other, whereby the connector 200 and the external connector 300 can be easily connected to each other.

The external connector 300 includes a fitting housing 310, a first external terminal 370, and a second external terminal 390, and the first external terminal 370 and the second external terminal 390 are connected to the electronic device (not shown) with a first external conductor 470 and a second external conductor 490 (each of which is indicated by a two-dot dashed line in FIG. 7) interposed therebetween, respectively.

The connector 200 and the external connector 300 are connected to each other, whereby the first connection terminal 270 of the connector 200 is connected to the first external terminal 370 of the external connector 300, and the second connection terminal 290 of the connector 200 is connected to the second external terminal 390 of the external connector 300.

As mentioned above, the first external terminal 370 of the external connector 300 is connected to the electronic device with the first external conductor 470 interposed therebetween, and the second external terminal 390 of the external connector 300 is connected to the electronic device with the second external conductor 490 interposed therebetween. Hence, the connector 200 and the external connector 300 are connected to each other, whereby the thread battery 3 can be easily connected to the electronic device.

Note that the first connection terminal 270 and the first current collector 70 may be directly connected to each other without interposing the first conductor 170 therebetween. Moreover, the second connection terminal 290 and the second current collector 90 may be directly connected to each other without interposing the second conductor 190 therebetween.

In the connector 200 illustrated in FIG. 7, both the first connection terminal 270 and the second connection terminal 290 protrude from the fitting housing 210 toward the thread battery 3; however, the first connection terminal 270 and the second connection terminal 290 may be disposed so as not to protrude from the fitting housing 210 toward the thread battery 3.

Moreover, in the external connector 300, both the first external terminal 370 and the second external terminal 390 protrude from the fitting housing 310 toward the electronic device; however, the first external terminal 370 and the second external terminal 390 may be disposed so as not to protrude from the fitting housing 310 toward the electronic device.

A material that constitutes the fitting housings of the connector and the external connector is not particularly limited; however, examples thereof include resins such as: general-purpose resins such as polypropylene (PP) and polyethylene terephthalate (PET); engineering resins such as fluororesin (FR) and polyamide (PA); thermosetting resins such as phenol resin (PF) and epoxy resin (EP); styrene resin; vinyl chloride resin; olefin resin; urethane resin; and silicone rubber.

The connector and the external connector may be provided with a locking mechanism.

Examples of the locking mechanism include: a mechanism in which a spiral groove is provided on the surface of each of the connector and the external connector to screw the connector and the external connector to each other; a slide locking mechanism; a side locking mechanism; a center locking mechanism; a push locking mechanism; and the like.

A part of the connector and a part of the external connector may be covered with a covering thread.

Figure 8:
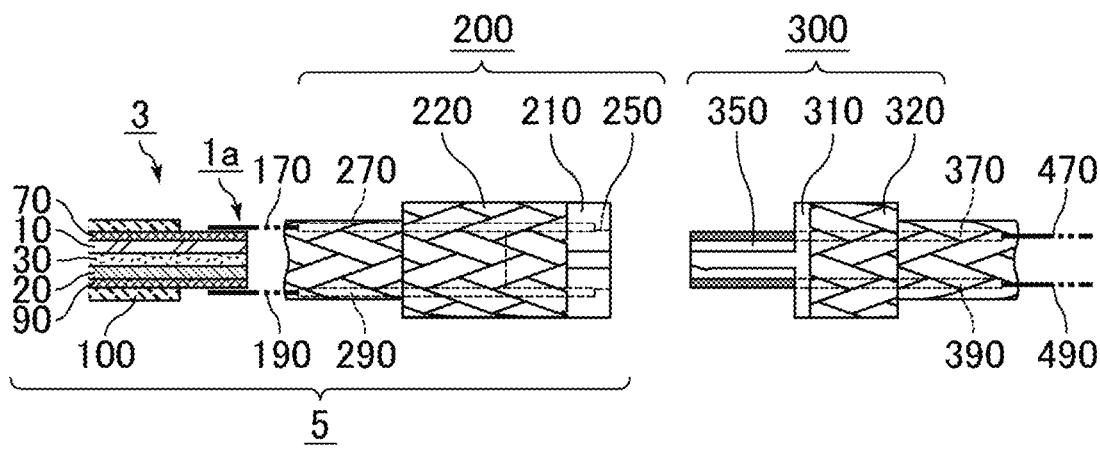
FIG. 8 is a schematic view illustrating another example of the connector-attached thread battery and an example of an external connector according to the present invention.

FIG. 8 is a schematic view illustrating another example of the connector-attached thread battery and the external connector according to the present invention.

In FIG. 8, a part of the connector 200 included in the connector-attached thread battery 5 is covered with a covering thread 220. Specifically, the covering thread 220 covers: a part of the fitting housing 210; a portion of the first connection terminal 270, which protrudes from the fitting housing 210 toward the thread battery 3; a portion of the second connection terminal 290, which protrudes from the fitting housing 210 toward the thread battery 3; a wire connection portion between the first connection terminal 270 and the first conductor 170; a wire connection portion between the second connection terminal 290 and the second conductor 190; and a part of the first conductor 170 and a part of the second conductor 190.

When the covering thread 220 is provided, the wire connection portions can be physically protected, and the first connection terminal 270 and the first conductor 170 can be prevented from being disconnected from each other, and the second connection terminal 290 and the second conductor 190 can be prevented from being disconnected from each other.

For example, the covering thread 220 may cover all of the first conductor 170 and the second conductor 190, and may cover a part or all of the thread battery 3 connected to the first conductor 170 and the second conductor 190.

Moreover, the first conductor 170 and the second conductor 190 may be covered with one covering thread as long as being insulated from each other; however, may be covered with different covering threads.

When the first conductor 170 and the second conductor 190 are covered with the different covering threads, the first conductor 170 covered with the covering thread and the second conductor 190 covered with the covering thread may be bundled with each other by being covered with another covering thread.

A part of the external connector 300 is covered with a covering thread 320. Specifically, the covering thread 320 covers: a part of the fitting housing 310; a portion of the first external terminal 370, which protrudes from the fitting housing 310 toward the electronic device; a portion of the second external terminal 390, which protrudes from the fitting housing 310 toward the electronic device; a wire connection portion between the first external terminal 370 and the first external conductor 470; a wire connection portion between the second external terminal 390 and the second external conductor 490; and a part of the first external conductor 470 and a part of the second external conductor 490. The external connector 300 is connected to the electronic device (not shown) with the first external conductor 470 and the second external conductor 490 interposed therebetween.

The covering thread may be a single thread, may be a twisted thread, or may be a covered yarn composed of a core thread and a wound thread wound around an outside of the core thread.

Figure 9A:
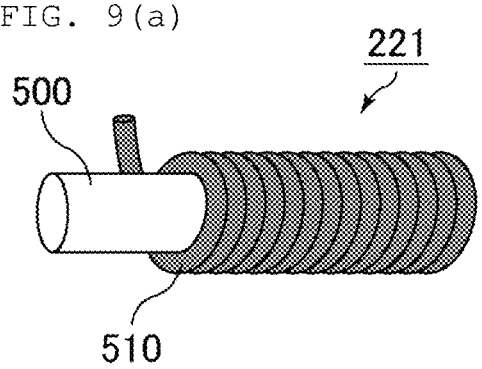
FIGS. 9(a) to 9(c) are schematic views illustrating examples of a covering thread.
Figure 9B:
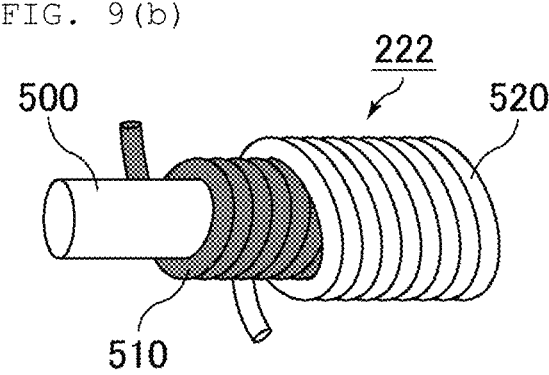
Figure 9C:
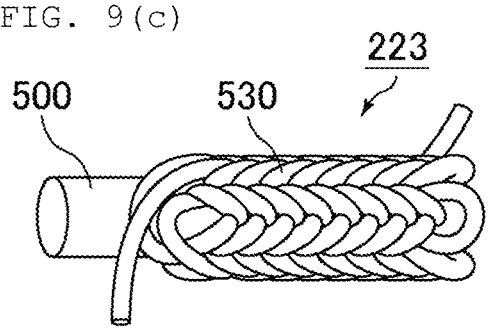

FIGS. 9(a) to 9(c) are schematic views illustrating examples of the covering thread.

In FIG. 9(a), a wound thread 510 is wound in one direction around a core thread 500. A covering thread 221 illustrated in FIG. 9(a) is called a single covered yarn. In FIG. 9(a), the wound thread 510 is wound in an S-direction; however, may be wound in a Z-direction.

In FIG. 9(b), after the wound thread 510 is wound around the core thread 500, a wound thread 520 is further wound in an opposite direction on an outer peripheral surface thereof. A covering thread 222 illustrated in FIG. 9(b) is called a double covered yarn. Preferably, directions of winding the wound thread 510 and the wound thread 520 are directions different from each other. For example, in FIG. 9(b), the wound thread 510 is wound in the S-direction, and the wound thread 520 is wound in the Z-direction.

In FIG. 9(c), the surface of the core thread 500 is covered with a knitted wound thread 530. A covering thread 223 illustrated in FIG. 9(c) is called a knit covering yarn.

When the covering thread is viewed from the front so that the core thread faces up and down, it is the Z-direction that is a direction in which the winding direction of the wound thread disposed in front of the core thread goes from lower left toward upper right or goes from upper right toward lower left, and it is the S-direction that is an opposite direction to the above, that is, in which the winding direction of the wound thread disposed in front of the core thread goes from upper left toward lower right or goes from lower right toward upper left.

A material that constitutes the covering thread is not particularly limited; however, examples thereof include natural fiber, synthetic chemical fiber. and the like As a material of such chemical synthetic fiber, a hot melt resin and a thermoplastic resin are preferably used.

When the covering thread is composed of the hot melt resin, the covering thread is thermally compressed to the connector after being wound therearound, whereby the covering thread is molten by heating, thus making it possible to fix the covering thread to the connector. Moreover, knits are closed by melting the covering thread, and the connector can be imparted with characteristics such as water resistance, dust resistance, heat resistance, chemical resistance and light resistance.

Examples of the hot melt resin include ethylene-vinyl acetate (EVA) resin and the like.

Examples of the thermoplastic resin include polyethylene resin, polyester resin, nylon (polyamide) resin, polypropylene resin, and the like.

A method for covering the connector and the wire connection portion with the covering thread is not particularly limited; however, examples thereof include knit covering and the like.

The surface of the covering thread may be further covered with a cover member as illustrated in FIG. 10.

FIG. 10 is a schematic view illustrating still another example of the connector-attached thread battery and the external connector according to the present invention.

FIG. 10 shows a state in which a part of the surface of the covering thread 220 of the connector 200 illustrated in FIG. 8 and a part of the surface of the covering thread 320 of the external connector 300 illustrated therein are covered with a cover member 230 and a cover member 330, respectively. The description of the thread battery 3 connected to the first conductor 170 and the second conductor 190 is omitted.

When the connector and the wire connection portions are covered with the cover member, the connector can be imparted with characteristics such as water resistance, dust resistance, heat resistance, chemical resistance and light resistance.

A material that constitutes the cover members is not particularly limited; however, a thermosetting resin or the like can be used.

A periphery of each covering thread is covered with the above material, followed by heating, whereby the cover member can be formed on the covering thread.

Note that the cover member may be provided without covering the surface of the connector with the covering thread. In this case, preferably, a region to be covered with the cover member is the same as a region to be provided with the covering thread.

Examples of the thermosetting resin include polyvinyl chloride-based resin, polyolefin-based resin, and the like.

The connector may include an electronic component in the inside thereof.

Figure 11A:
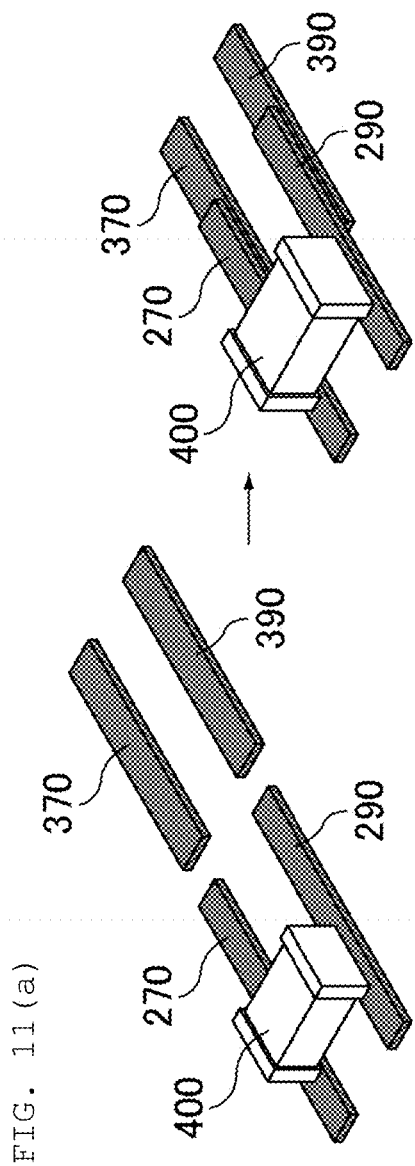
FIG. 11(a) is a perspective view schematically illustrating an example of connection terminals which constitute a connector and external terminals which constitute an external connector.
Figure 11B:
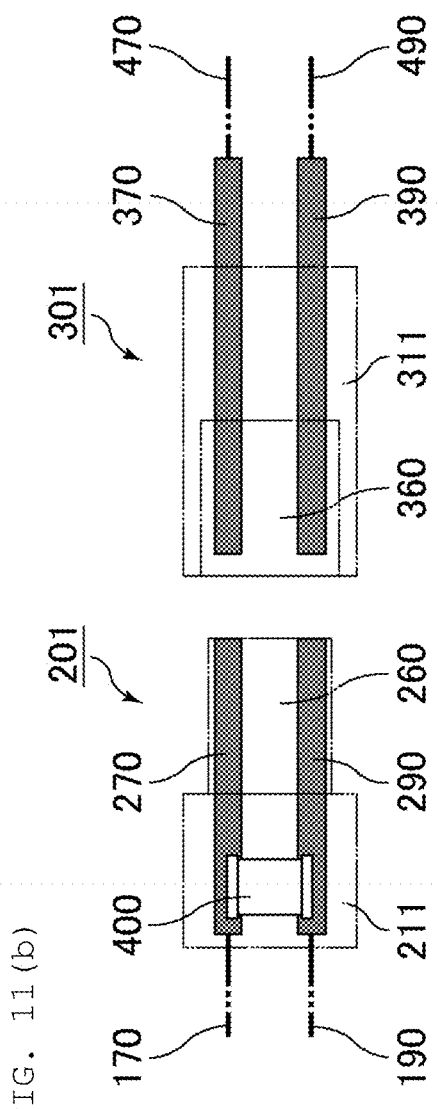
FIG. 11(b) is a view schematically illustrating a state of a connector including the connection terminals illustrated in FIG. 11(a) and an external connector including the external terminals illustrated in FIG. 11(a).

Referring to FIGS. 11(a) and 11(b), a description will be given of an example of the connector including the electronic component in the inside thereof.

FIG. 11(a) is a perspective view schematically illustrating an example of connection terminals which constitute the connector and external terminals which constitute the external connector, and FIG. 11(b) is a view schematically illustrating a state of the connector including the connection terminals illustrated in FIG. 11(a) and an external connector including the external terminals illustrated in FIG. 11(a).

Note that a positional relationship between the connector and the external connector, which is illustrated in FIG. 11(b), corresponds to a left side of FIG. 11(a).

As illustrated in FIGS. 11(a) and 11(b), the first connection terminal 270 and the second connection terminal 290 which constitute a connector 201 are disposed at a predetermined interval, and an electronic component 400 is disposed so as to straddle between the first connection terminal 270 and the second connection terminal 290. The connector 201 has a protrusion 260, and a shape of the protrusion 260 corresponds to a recess 360 provided in the external connector 301. Hence, the connector 201 and the external connector 301 are fittable to each other. At this time, since the electronic component 400 is disposed in a fitting housing 211, the electronic component 400 does not interfere with fitting of the connector 201 and the external connector 301.

Referring to FIGS. 12(a) and 12(b), a description will be given of another example of the connector including the electronic component in the inside thereof.

FIG. 12(a) is a perspective view schematically illustrating another example of the connection terminals which constitute the connector and the external terminals which constitute the external connector, and FIG. 12(b) is a view schematically illustrating a state of a connector including the connection terminals illustrated in FIG. 12(a) and an external connector including the external terminals illustrated in FIG. 12(a).

Note that a positional relationship between the connector and the external connector, which is illustrated in FIG. 12(b), corresponds to a left side of FIG. 12(a).

As illustrated in FIGS. 12(a) and 12(b), in a connector 202, the first connection terminal 270 and the second connection terminal 290 are disposed so as to face each other, and the electronic component 400 is disposed so as to be sandwiched between the first connection terminal 270 and the second connection terminal 290. The connector 202 has a protrusion 260, and the shape of the protrusion 260 corresponds to a recess 360 provided in an external connector 302. Hence, the connector 202 and the external connector 302 are fittable to each other. At this time, since the electronic component 400 is disposed in a fitting housing 212, the electronic component 400 does not interfere with fitting of the connector 202 and the external connector 302.

Examples of the electronic component to be disposed in the connector include a fuse, an EMI filter, a sensor, a heater, an LED, a wireless chip, a chip battery, a vibrator, a memory element, a semiconductor element, an antenna, a small electronic circuit, and the like.

The number of such electronic components to be disposed in the connector may be one, or may be two or more.

The connector is connected to the external connector, whereby the thread battery of the present invention can be easily connected to the electronic device or the like.

Figure 13:
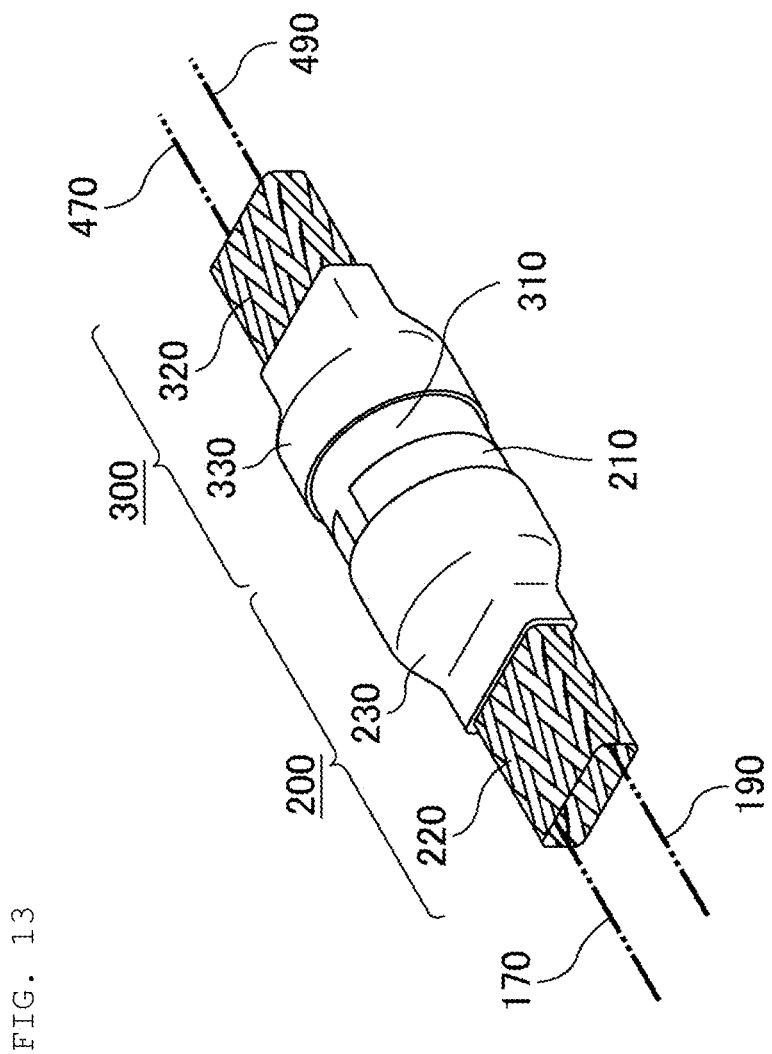
FIG. 13 is a perspective view illustrating an example of a case where the connector and the external connector which are illustrated in FIG. 10 are connected to each other.

FIG. 13 illustrates an example of a state in which the external connector is connected to the thread battery.

FIG. 13 is a perspective view illustrating an example of a case where the connector and the external connector which are illustrated in FIG. 10 are connected to each other.

FIG. 13 schematically illustrates a state in which the connector 200 and the external connector 300 which are illustrated in FIG. 10 are connected to each other. The covering thread 220 and the cover member 230 are provided on the outside of the connector 200, and the covering thread 320 and the cover member 330 are provided on the outside of the external connector 300.

The connector 200 and the external connector 300 are connected to each other, whereby the first connection terminal 270 of the connector 200 is connected to the first external terminal 370 of the external connector 300, and the second connection terminal 290 of the connector 200 is connected to the second external terminal 390 of the external connector 300.

The first connection terminal 270 and second connection terminal 290 of the connector 200 are connected to the first current collector and second current collector of the thread battery with the first conductor 170 and the second conductor 190 interposed therebetween, respectively. Moreover, the first external terminal 370 and second external terminal 390 of the external connector 300 are connected to the electronic component with the first external conductor 470 and the second external conductor 490 interposed therebetween, respectively. Hence, the connector 200 and the external connector 300 are connected to each other, whereby the thread battery can be easily connected to the electronic device.

[Method for Manufacturing Thread Battery]

A method for manufacturing the thread battery of the present invention is not particularly limited.

The thread battery 2 illustrated in FIGS. 4(a) and 4(b) can be obtained, for example, by preparing a thread-like solid electrolyte, a thread-like first electrode, a thread-like second electrode, a thread-like first current collector, and a thread-like second current collector, disposing the first electrode and the second electrode on an outer peripheral surface of the solid electrolyte so that both thereof do not come into contact with each other, and disposing the first current collector on an outer peripheral surface of the first electrode and the second current collector on an outer peripheral surface of the second electrode. Moreover, an outermost peripheral surface of the thread battery 2 is coated with an insulating film made of an insulating material, whereby the thread battery 4 illustrated in FIG. 6 can be obtained.

Examples of a method for obtaining the thread-like solid electrolyte include a method of spinning and firing a mixed solution containing a material that constitutes the solid electrolyte, an organic binder and a dispersion medium.

Moreover, the material that constitutes the solid electrolyte may be processed into a thread in a molten state.

Examples of a method for obtaining the thread-like first electrode include a method of spinning and firing a mixed solution containing a material that constitutes the first electrode, an organic binder and a dispersion medium.

Moreover, the material that constitutes the first electrode may be processed into a thread in a molten state.

Examples of a method for obtaining the thread-like second electrode include a method of spinning and firing a mixed solution containing a material that constitutes the second electrode, an organic binder and a dispersion medium.

Moreover, the material that constitutes the second electrode may be processed into a thread in a molten state.

Examples of a method for obtaining the thread-like first current collector include a method of processing a material that constitutes the first current collector into a thread by an extension process or the like.

Moreover, the method may be a method of spinning and firing a mixed solution containing the material that constitutes the first current collector, an organic binder, and a dispersion medium.

Examples of a method for obtaining the thread-like second current collector include a method of processing a material that constitutes the second current collector into a thread by an extension process or the like.

Moreover, the method may be a method of spinning and firing a mixed solution containing the material that constitutes the second current collector, an organic binder, and a dispersion medium.

Examples of a method for coating the outermost peripheral surface with the insulating film made of an insulating material include a method of preparing a mixed solution obtained by mixing an insulating material and a dispersion medium, and applying the mixed solution onto an outermost peripheral surface of a structure composed of a solid electrolyte, a first electrode, a second electrode, a first current collector and a second current collector, followed by drying.

Moreover, when the thread battery 1 illustrated in FIG. 1 is manufactured, for example, a composite spinning nozzle can be used.

An outlet section of the composite spinning nozzle for use has a shape corresponding to sectional shapes of the first electrode 10, the second electrode 20, and the solid electrolyte 30 which are illustrated in FIG. 5. Moreover, a flow path in the composite spinning nozzle has a shape that is separated for each of the first electrode 10, the second electrode 20 and the solid electrolyte 30 and communicates with outlet sections thereof. A mixed solution containing a material that constitutes the first electrode, an organic binder and a dispersion medium, a mixed solution containing a material that constitutes the second electrode, an organic binder and a dispersion medium, and a mixed solution containing a material that constitutes the solid electrolyte, an organic binder and a dispersion medium are simultaneously discharged from the respective independent flow paths of the composite spinning nozzle, and the mixed solutions thus discharged are spun, and are co-sintered. In this way, there can be obtained a structure that has such a shape as illustrated in FIG. 1 and is composed of the thread-like solid electrolyte 30 that extends in the longitudinal direction and of the first electrode 10 and the second electrode 20, each of which is disposed on a part of the outer peripheral surface of the solid electrolyte along the longitudinal direction.

Moreover, flow paths for the gaps 60 are formed in the composite spinning nozzle, and a mixed solution containing only an organic binder and a dispersion medium is discharged from the flow paths during spinning, and is co-sintered, whereby the gaps 60 can be stably formed.

The first current collector 70 and the second current collector 90 are formed on the surfaces of the first electrode 10 and the second electrode 20 of the obtained structure, respectively by laser processing, sputtering, plating, or the like, whereby such a thread battery 1 as illustrated in FIG. 3 can be obtained.

The insulating film 100 is formed on the surface of this thread battery 1 by a dipping method, a coating method, or the like, whereby such a thread battery 3 as illustrated in FIG. 5 can be obtained.

[Method for Manufacturing Connector-Attached Thread Battery]

The connector-attached thread battery of the present invention can be obtained, for example, by connecting the first electrode of the thread battery fabricated by the above procedure and the first connection terminal of the connector to each other with the first conductor interposed therebetween and connecting the second electrode of the thread battery and the second connection terminal of the connector to each other with the second conductor interposed therebetween.

Moreover, the fitting housing, the first conductor, the second conductor, the wire connection portion between the first connection terminal and the first conductor, and the wire connection portion between the second connection terminal and the second conductor, all of which constitute the connector, may be covered with the covering thread, and the outside of the covering thread may be covered with the cover member.

A method for manufacturing the connector is not particularly limited; however, the connector can be obtained by combining the fitting housing molded into a predetermined shape with the first connection terminal and the second connection terminal and disposing an electronic component between the first connection terminal and the second connection terminal according to needs.

The first connection terminal and the first electrode may be directly connected to each other without interposing the first conductor therebetween, and the second connection terminal and the second electrode may be directly connected to each other without interposing the second conductor therebetween.

For example, in the manufacturing method mentioned above, the thread-like first current collector and the thread-like second current collector may be prepared so that lengths thereof are larger than lengths of the thread-like first electrode, the thread-like second electrode, and the thread-like solid electrolyte, the thread-like first electrode, the thread-like second electrode, the thread-like solid electrolyte, the thread-like first current collector and the thread-like second current collector may be combined with one another so that the thread-like first current collector and the thread-like second current collector protrude from the same end, and the thread-like first current collector and the thread-like second current collector, which protrude, may be directly connected to the first connection terminal and the second connection terminal, which constitute the connector, respectively.

DESCRIPTION OF REFERENCE SYMBOLS 1, 2, 3, 4: Thread battery
1a: First end
1b: Second end
5: Connector-attached thread battery
10: First electrode
20: Second electrode
30: Solid electrolyte
60: Gap
70: First current collector
90: Second current collector
100: Insulating film
170: First conductor
190: Second conductor
200, 201, 202: Connector
210, 211, 212, 310, 311, 312: Fitting housing
220, 221, 222, 223, 320: Covering thread
230, 330: Cover member
250, 360: Recess
260, 350: Protrusion
270: First connection terminal
290: Second connection terminal
300, 301, 302: External connector
370: First external terminal
390: Second external terminal
400: Electronic component
470: First external conductor
490: Second external conductor
500: Core thread
510, 520, 530: Wound thread

The invention claimed is:
1. A thread battery comprising:
a thread-like solid electrolyte that extends in a longitudinal direction between a first end and a second end that face each other in the longitudinal direction;
a first electrode on a first part of an outer peripheral surface of the solid electrolyte along the longitudinal direction;
a second electrode on a second part of the outer peripheral surface of the solid electrolyte along the longitudinal direction, wherein the first electrode and the second electrode do not contact each other;
a first current collector on an outer peripheral surface of the first electrode along the longitudinal direction; and
a second current collector on an outer peripheral surface of the second electrode along the longitudinal direction.

2. The thread battery according to claim 1, wherein the first electrode, the second electrode, and the solid electrolyte all contain oxides.

3. The thread battery according to claim 2, wherein the oxides are selected from a lithium-containing phosphoric acid compound having a NASICON-type structure, an oxide solid electrolyte having a perovskite-type structure, and an oxide solid electrolyte having a garnet-type structure.

4. The thread battery according to claim 2, wherein at least one of the first electrode and the second electrode contains a same oxide as contained in the solid electrolyte.

5. The thread battery according to claim 4, wherein the same oxide is selected from a lithium-containing phosphoric acid compound having a NASICON-type structure, an oxide solid electrolyte having a perovskite-type structure, and an oxide solid electrolyte having a garnet-type or garnet-like structure.

6. The thread battery according to claim 4, wherein a content of the same oxide in the at least one of the first electrode and the second electrode is 30% by weight to 70% by weight.

7. The thread battery according to claim 2, wherein each of the first electrode and the second electrode contain a same oxide as contained in the solid electrolyte.

8. The thread battery according to claim 7, wherein the same oxide is selected from a lithium-containing phosphoric acid compound having a NASICON-type structure, an oxide solid electrolyte having a perovskite-type structure, and an oxide solid electrolyte having a garnet-type or garnet-like structure.

9. The thread battery according to claim 7, wherein a content of the same oxide in each of the first electrode and the second electrode is 30% by weight to 70% by weight.

10. The thread battery according to claim 1, further comprising an insulating material covering at least a part of an outermost peripheral surface of the thread battery.

11. The thread battery according to claim 1, wherein a diameter of the thread battery is 0.005 mm to 1 mm.

12. The thread battery according to claim 1, wherein a ratio of a diameter to a length of the thread battery is 5 or more.

13. A connector-attached thread battery comprising:
the thread battery according to claim 1; and
a connector connected to the first end or the second end of the thread battery, wherein the connector includes:
 a first connection terminal connected to the first current collector; and
 a second connection terminal connected to the second current collector.

14. The connector-attached thread battery according to claim 13, further comprising a covering thread covering at least a part of the connector.

15. The connector-attached thread battery according to claim 13, further comprising an electronic component connected between the first connection terminal and the second connection terminal.

16. A connector-attached thread battery comprising:
the thread battery according to claim 1;
a first connector connected to the first end of the thread battery; and
a second connector connected to the second end of the thread battery,
wherein each of the first connector and the second connector include:
 a first connection terminal connected to the first current collector; and
 a second connection terminal connected to the second current collector.

17. The connector-attached thread battery according to claim 16, further comprising:
a first covering thread covering at least a part of the first connector; and
a second covering thread covering at least a part of the second connector.

18. The connector-attached thread battery according to claim 16, further comprising an electronic component connected between the first connection terminal and the second connection terminal of at least one of the first connector and the second connector.

* * * * *